United States Patent
Benoit et al.

(10) Patent No.: US 12,169,588 B2
(45) Date of Patent: Dec. 17, 2024

(54) SECURING EXTERNAL DATA STORAGE FOR A SECURE ELEMENT INTEGRATED ON A SYSTEM-ON-CHIP

(71) Applicant: Google LLC, Mountain View, CA (US)

(72) Inventors: Olivier Jean Benoit, San Diego, CA (US); Osman Koyuncu, San Diego, CA (US)

(73) Assignee: Google LLC, Mountain View, CA (US)

( * ) Notice: Subject to any disclaimer, the term of this patent is extended or adjusted under 35 U.S.C. 154(b) by 385 days.

(21) Appl. No.: 17/439,368

(22) PCT Filed: Aug. 29, 2019

(86) PCT No.: PCT/US2019/048837
§ 371 (c)(1),
(2) Date: Sep. 14, 2021

(87) PCT Pub. No.: WO2021/040721
PCT Pub. Date: Mar. 4, 2021

(65) Prior Publication Data
US 2022/0156411 A1    May 19, 2022

(51) Int. Cl.
*G06F 21/79* (2013.01)
*G06F 21/62* (2013.01)

(52) U.S. Cl.
CPC .......... *G06F 21/79* (2013.01); *G06F 21/6209* (2013.01)

(58) Field of Classification Search
CPC ............................ G06F 21/79; G06F 21/6209
See application file for complete search history.

(56) References Cited

U.S. PATENT DOCUMENTS 5,892,900 A * 4/1999 Ginter .................... H04L 63/20
726/26
6,286,066 B1    9/2001 Hayes et al.
(Continued)

FOREIGN PATENT DOCUMENTS

CN    106797311 A    5/2017
CN    110023941 A    7/2019
(Continued)

OTHER PUBLICATIONS

17439368, InnovationQ+IP NPL Search (Year: 2023).*
(Continued)

*Primary Examiner* — Samson B Lemma
*Assistant Examiner* — Richard W Cruz-Franqui
(74) *Attorney, Agent, or Firm* — Colby Nipper PLLC

(57) ABSTRACT

Techniques and apparatuses are described that implement the secure external data storage. A computing system may include a system-on-chip as a main processing complex and one or more secure elements that execute specialized functions related to sensitive information. While the secure element may use an external flash for storage for performance reasons, storing sensitive information on an external flash may expose the sensitive information if the external flash is ever compromised. The disclosed techniques and apparatuses provide an integrated secure element, of a system-on-chip, which leverages a secure channel with a secure flash to manage a cryptographic key for securing sensitive information stored on an unsecured external flash to prevent the exposure of sensitive information.

20 Claims, 5 Drawing Sheets

(56) References Cited

U.S. PATENT DOCUMENTS

| | | | |
|---|---|---|---|
| 6,948,070 B1* | 9/2005 | Ginter | H04N 21/8355 380/231 |
| 7,051,212 B2* | 5/2006 | Ginter | G06Q 20/14 380/231 |
| 7,069,451 B1* | 6/2006 | Ginter | G06Q 20/24 713/168 |
| 7,076,652 B2* | 7/2006 | Ginter | H04L 9/0861 713/153 |
| 7,095,854 B1* | 8/2006 | Ginter | H04N 21/25875 380/231 |
| 7,100,199 B2* | 8/2006 | Ginter | H04L 63/123 380/231 |
| 7,120,800 B2* | 10/2006 | Ginter | G06F 21/33 375/E7.009 |
| 7,133,845 B1* | 11/2006 | Ginter | G06F 21/10 705/52 |
| 7,215,781 B2* | 5/2007 | Grawrock | G06F 21/445 380/283 |
| 7,752,466 B2* | 7/2010 | Ginter | H04N 21/4627 713/192 |
| 7,831,823 B2* | 11/2010 | Ginter | G06Q 20/12 713/189 |
| 7,844,835 B2* | 11/2010 | Ginter | G06T 1/0021 713/192 |
| 7,917,749 B2* | 3/2011 | Ginter | H04N 21/8166 713/168 |
| 7,984,509 B2* | 7/2011 | Ginter | H04N 21/4753 713/192 |
| 8,006,087 B2* | 8/2011 | Ginter | G06Q 20/14 380/231 |
| 8,055,913 B2* | 11/2011 | Ginter | G06F 21/78 713/170 |
| 8,112,625 B2* | 2/2012 | Ginter | H04N 21/443 713/150 |
| 8,123,133 B2 | 2/2012 | Dubois et al. | |
| 8,141,165 B2* | 3/2012 | Ginter | H04L 63/20 713/192 |
| 8,181,021 B2* | 5/2012 | Ginter | G06F 21/42 713/193 |
| 8,191,157 B2* | 5/2012 | Ginter | H04N 21/4345 713/192 |
| 8,191,158 B2* | 5/2012 | Ginter | G07F 9/026 713/192 |
| 8,291,238 B2* | 10/2012 | Ginter | G06F 21/725 713/193 |
| 8,316,449 B2* | 11/2012 | Ginter | H04N 21/4143 705/51 |
| 8,332,931 B1* | 12/2012 | Tran | G06F 21/78 726/17 |
| 8,402,557 B2* | 3/2013 | Ginter | H04N 7/17309 705/52 |
| 8,412,837 B1* | 4/2013 | Emigh | H04L 9/30 705/65 |
| 8,423,789 B1* | 4/2013 | Poo | G06F 21/70 713/193 |
| 8,464,077 B2* | 6/2013 | Ginter | H04N 21/83555 713/192 |
| 8,533,851 B2* | 9/2013 | Ginter | G06F 21/725 713/193 |
| 8,533,854 B2* | 9/2013 | Ginter | H04L 9/0891 380/231 |
| 8,543,838 B1* | 9/2013 | Au | G06F 21/72 713/190 |
| 8,543,842 B2* | 9/2013 | Ginter | H04N 21/835 380/225 |
| 8,572,411 B2* | 10/2013 | Ginter | G06Q 30/0601 345/59 |
| 8,677,507 B2* | 3/2014 | Ginter | H04L 63/20 380/231 |
| 9,305,183 B2 | 4/2016 | Mittal | |
| 9,674,162 B1* | 6/2017 | Miller | H04L 63/06 |
| 9,792,446 B2 | 10/2017 | Chan et al. | |
| 9,825,920 B1* | 11/2017 | Yung | H04L 9/0822 |
| 9,893,885 B1* | 2/2018 | Miller | H04L 9/3066 |
| 10,171,251 B2 | 1/2019 | Kreft | |
| 10,447,665 B2* | 10/2019 | Kudaraya | H04L 9/0861 |
| 10,891,366 B1* | 1/2021 | Wu | H04L 9/0866 |
| 2002/0048369 A1* | 4/2002 | Ginter | G06F 21/572 380/246 |
| 2003/0163431 A1* | 8/2003 | Ginter | H04N 21/2541 705/64 |
| 2003/0191719 A1* | 10/2003 | Ginter | G06Q 20/023 375/E7.009 |
| 2004/0107356 A1* | 6/2004 | Shamoon | H04N 21/4405 375/E7.009 |
| 2005/0180572 A1* | 8/2005 | Graunke | H04L 9/0891 380/277 |
| 2005/0213766 A1 | 9/2005 | Goss | |
| 2006/0090084 A1* | 4/2006 | Buer | G06F 21/53 713/189 |
| 2006/0224902 A1* | 10/2006 | Bolt | G06F 21/10 713/193 |
| 2006/0242069 A1* | 10/2006 | Peterka | G06Q 20/00 705/50 |
| 2006/0259790 A1* | 11/2006 | Asokan | H04L 9/0838 713/194 |
| 2007/0130472 A1* | 6/2007 | Buer | H04L 63/0428 713/182 |
| 2007/0136609 A1* | 6/2007 | Rudelic | G06F 21/606 713/193 |
| 2007/0226807 A1* | 9/2007 | Ginter | H04N 21/2541 713/168 |
| 2007/0283158 A1* | 12/2007 | Danseglio | G11B 20/00086 713/180 |
| 2008/0005586 A1* | 1/2008 | Munguia | H04N 21/4367 348/E7.056 |
| 2008/0034231 A1* | 2/2008 | Ginter | G06Q 20/382 714/E11.207 |
| 2008/0034406 A1* | 2/2008 | Ginter | G06F 21/73 726/2 |
| 2008/0052541 A1* | 2/2008 | Ginter | G06F 21/51 713/193 |
| 2008/0092239 A1* | 4/2008 | Sitrick | H04N 21/4405 713/193 |
| 2008/0107275 A1* | 5/2008 | Asnaashari | G06F 21/80 380/281 |
| 2008/0130875 A1* | 6/2008 | Ahlquist | H04L 9/0662 380/29 |
| 2009/0048978 A1* | 2/2009 | Ginter | H04N 21/26613 705/51 |
| 2009/0257594 A1* | 10/2009 | Qureshi | H04L 9/0631 380/277 |
| 2010/0250939 A1* | 9/2010 | Adams | H04L 63/10 713/168 |
| 2011/0173162 A1* | 7/2011 | Anderson | G06F 11/1076 714/15 |
| 2012/0198224 A1* | 8/2012 | Leclercq | H04L 9/088 713/2 |
| 2012/0265975 A1* | 10/2012 | Kimelman | G06F 21/53 713/1 |
| 2013/0297948 A1* | 11/2013 | Lee | G06F 3/0619 713/193 |
| 2014/0020114 A1* | 1/2014 | Bhatia | G06F 21/87 726/27 |
| 2014/0032933 A1 | 1/2014 | Smith et al. | |
| 2014/0067772 A1* | 3/2014 | Sabbouh | G06F 16/22 707/E17.007 |
| 2014/0143889 A1* | 5/2014 | Ginter | G06F 21/87 726/27 |
| 2014/0173271 A1* | 6/2014 | Dadu | G06F 21/88 713/153 |
| 2014/0223569 A1* | 8/2014 | Gail | G06F 21/60 726/26 |
| 2014/0289539 A1* | 9/2014 | Osterwalder | H04L 9/3242 713/193 |
| 2014/0298040 A1* | 10/2014 | Ignatchenko | G06F 21/575 713/192 |
| 2015/0006789 A1 | 1/2015 | Buer | |

(56) References Cited

U.S. PATENT DOCUMENTS

| | | |
|---|---|---|
| 2015/0154424 A1 | 6/2015 | Mittal |
| 2015/0270971 A1* | 9/2015 | Dietrich ............... H04L 9/3228 713/168 |
| 2016/0174068 A1 | 6/2016 | Chang et al. |
| 2016/0191235 A1* | 6/2016 | Kim ...................... G06F 3/0653 713/193 |
| 2016/0232109 A1* | 8/2016 | Canter .................. G06F 3/0623 |
| 2016/0359635 A1 | 12/2016 | Kreft |
| 2017/0288875 A1* | 10/2017 | Xing ..................... H04L 9/0838 |
| 2017/0329995 A1* | 11/2017 | Benoit ................... G06F 21/64 |
| 2019/0042765 A1* | 2/2019 | Chung ................. G06F 21/575 |
| 2019/0220419 A1* | 7/2019 | Lin ....................... G06Q 50/184 |
| 2019/0278914 A1* | 9/2019 | Le Roy ................ G06F 21/575 |
| 2019/0327086 A1* | 10/2019 | Slowik ................. H04L 9/3247 |
| 2019/0340365 A1* | 11/2019 | Nijhawan ............... G06F 21/44 |
| 2020/0053061 A1* | 2/2020 | Cambou ............. H04L 63/0457 |
| 2020/0084032 A1* | 3/2020 | Brickell .................. G06F 21/71 |
| 2020/0134202 A1* | 4/2020 | Sapuntzakis .......... H04L 9/0891 |
| 2020/0213287 A1* | 7/2020 | Zhang .................. H04L 63/123 |
| 2020/0235929 A1* | 7/2020 | Jacobs .................. H04L 9/3073 |
| 2020/0358620 A1* | 11/2020 | Kim ...................... H04L 9/3242 |
| 2021/0058237 A1* | 2/2021 | Sandberg ................ G06F 21/72 |
| 2021/0218717 A1* | 7/2021 | Hill ...................... H04L 9/0822 |
| 2022/0132298 A1* | 4/2022 | Shiner ................... H04W 12/72 |
| 2022/0156411 A1* | 5/2022 | Benoit ............... G06F 21/6209 |
| 2023/0106942 A1* | 4/2023 | Wong ...................... H04L 9/005 380/277 |
| 2023/0237146 A1* | 7/2023 | Balakrishnan .......... H04L 9/321 726/6 |

FOREIGN PATENT DOCUMENTS

| | | | |
|---|---|---|---|
| KR | 20160019780 | * 2/2016 | ............ G06F 21/79 |
| WO | 2021040721 | 3/2021 | |

OTHER PUBLICATIONS

NPL History Search (Year: 2024).*
NPL Search History (Year: 2024).*
"International Preliminary Report on Patentability", Application No. PCT/US2019/048837, Mar. 1, 2022, 8 pages.
"International Search Report and Written Opinion", PCT Application No. PCT/US2019/048837, Apr. 30, 2020, 13 pages.
Bhat, "Secure Boot and Encrypted Data Storage", Timesys Corporation, Jul. 13, 2017, 7 pages.
Magdum, et al., "A Secure Data Transfer Algorithm for USB Mass Storage Devices to Protect Documents", International Journal of Emerging Engineering Research and Technology vol. 2, Issue 4, Jul. 2014, pp. 113-119, 7 pages.
Sukhomlinov, et al., "Mitigating Malicious Firmware by Detecting the Removal of a Storage Device", Technical Disclosure Commons; Retrieved from https://www.tdcommons.org/dpubs_series/2378, Aug. 2, 2019, 10 pages.
Sukhomlinov, et al., "Supply Chain Verification of Hardware Components Using Open-Source Root of Trust", Technical Disclosure Commons; Retrieved from https://www.tdcommons.org/dpubs_series/2884, Jan. 22, 2020, 14 pages.
"Foreign Office Action", EP Application No. 19769297.3, Dec. 14, 2023, 4 pages.
"Foreign Office Action", CN Application No. 201980079723.6, Jun. 13, 2024, 19 pages.

* cited by examiner

SECURING EXTERNAL DATA STORAGE FOR A SECURE ELEMENT INTEGRATED ON A SYSTEM-ON-CHIP

RELATED APPLICATION

This application is a national stage entry of International Application No. PCT/US2019/048837, filed Aug. 29, 2019, the disclosure which is incorporated herein by reference in its entirety.

BACKGROUND

A computing system may include a system-on-chip (SoC) as a main processing complex and one or more secure elements that execute specialized functions related to sensitive information. A secure element can include its own internal flash for non-volatile storage. In some high-end computing systems, the secure element is integrated into the SoC for performance reasons. Rather than an internal flash that potentially slows down the performance of the SoC, an integrated secure element may use an external flash for storage. Storing sensitive information on a flash placed outside the SoC risks exposing the sensitive information if the external flash is ever compromised.

SUMMARY

An integrated secure element, of a system-on-chip (SoC), which leverages a secure channel with a secure flash to manage a cryptographic key for securing sensitive information stored on an unsecured external data storage, is described. The term "external data storage" is in reference to flash memory or other non-volatile storage that is physically distinct from the SoC and secure elements integrated on the SoC. Also sometimes referred to as a separate component or separate chip, external data storage, as referred to herein, is accessible to the SoC but not integrated on the SoC and therefore is external to the SoC. A computing system includes a SoC with an integrated secure element. The secure element executes specialized functions related to sensitive information (e.g., cryptographic keys, network access credentials, security keys, financial data, user data). The secure element and other components of the computing system and the SoC store data on a main external flash, or in other words, an external data storage. The computing system includes a second (e.g., smaller) external flash that is assigned to the secure element, storing the secure element's anti-replay counters, timestamp information, and flash cryptographic key. The secure element and the second flash are provisioned with matching certified public keys and corresponding private keys, at the time of manufacturing. Given the certified public keys and the corresponding private keys, and a previously agreed to protocol, such as authenticated Diffie-Hellman, the secure element and the second flash establish a secure channel.

The second flash automatically updates the flash cryptographic key periodically, in response to a write operation, or at some other interval. The secure element obtains an updated flash cryptographic key from the second flash over the secure channel, or the secure element generates the updated flash cryptographic key and provides the updated flash cryptographic key to the second flash over the secure channel. The secure element automatically encrypts data it stores on the main external flash using a regularly updated flash cryptographic key. In this way, even if an attacker compromises a current version of the flash cryptographic key, the flash cryptographic key regularly and automatically changes, making the current version unusable in the future, thereby providing what is commonly referred to in secure-computing as "perfect forward security".

In one example, a method for securing sensitive information at an external flash of a computing system is described. The method includes communicating, by an integrated secure element of a system-on-chip and over a dedicated channel between the integrated secure element and a second flash of the computing system, information for determining a shared secret key based on a respective copy of public and private keys preprogrammed into each of the integrated secure element and the second flash; securing, based on the shared secret key, the dedicated channel to provide the integrated secure element with exclusive access to a flash cryptographic key stored by the second flash; responsive to securing the dedicated channel, accessing, via the dedicated channel, the flash cryptographic key stored by the second flash; and encrypting or decrypting, using the flash cryptographic key, sensitive information stored at the external flash.

In another example, a mobile computing device is described that includes an integrated secure element of a system-on-chip configured to perform the preceding method is described.

In another example, a system including means to perform the preceding method is described.

In another example, a computer-readable storage medium is described including instructions that, when executed, configure an integrated secure element of a system-on-chip to perform the preceding method.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

One or more aspects of securing external data storage for an integrated secure element is described in detail below. The use of the same reference numbers in different instances in the description and the figures indicate similar elements.

DETAILED DESCRIPTION

Figure 1:
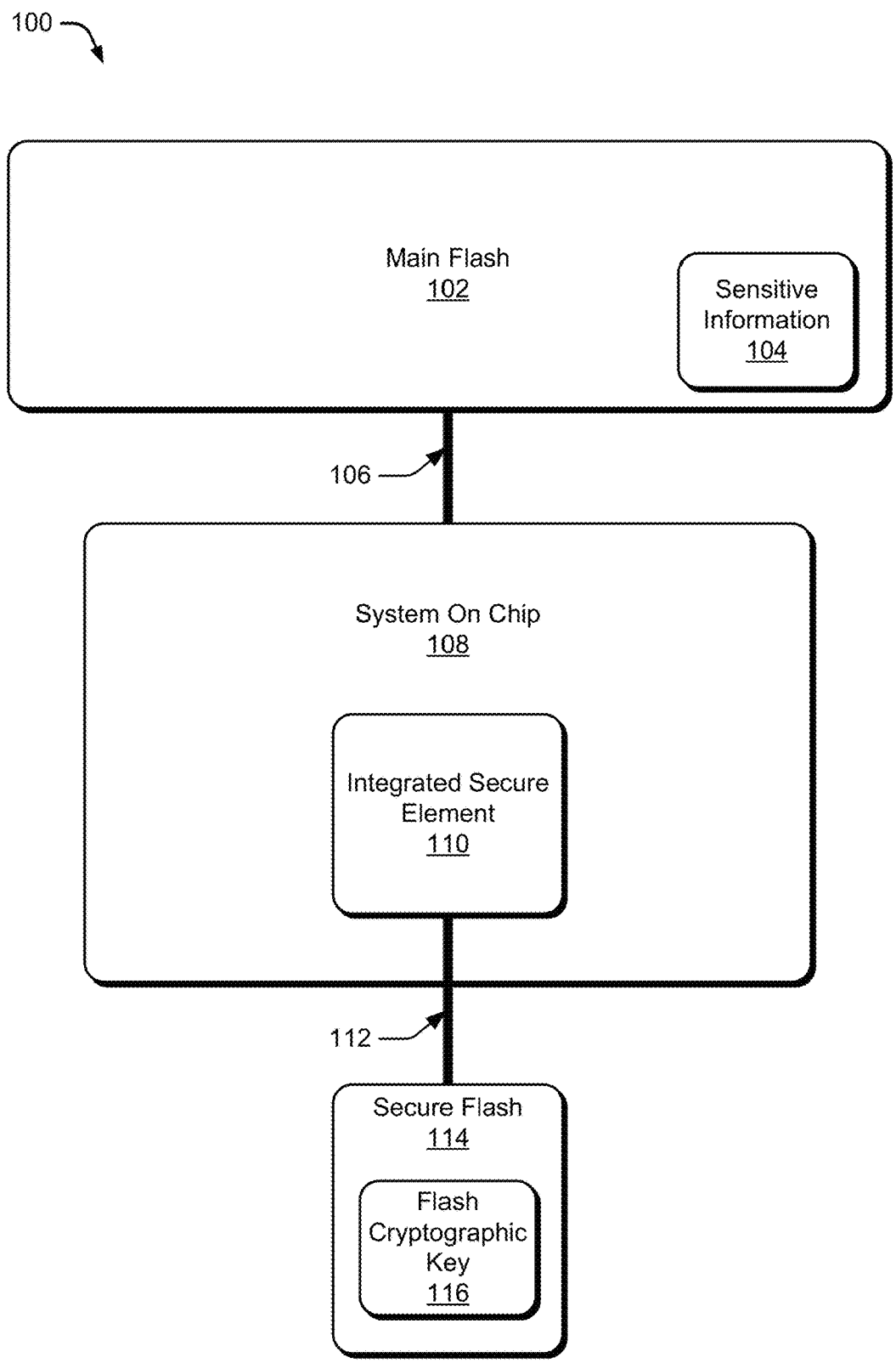
FIG. 1 is a conceptual diagram illustrating an example system that secures external data storage for an integrated secure element.

An integrated secure element of a system-on-chip (SoC) is described which leverages a secure channel with a secure flash to manage a cryptographic key for securing sensitive information stored on an unsecured external flash, i.e., a flash that is external to the SoC. The combination of a secure flash, a non-secure flash, and a secure, dedicated channel, help secure the data stored on the non-secure flash. The security provided by the combination of components is scalable to secure increasing amounts of sensitive information, without compromising usability.

For example, a computing system, such as a mobile telephone, includes the SoC as a main processing complex and an external flash. The SoC includes an integrated secure element, or multiple secure elements, for executing specialized functions using sensitive information. The sensitive information is stored with other information on the external flash.

The external flash is typically "the device flash" and delivers high-performance, reliability, and a large amount of storage space. The terms "external flash" and "external data storage" are used herein to reference a flash memory or other types of non-volatile data storage that is physically distinct and separated from a SoC and secure elements integrated on the SoC. Also sometimes referred to as a separate component or separate chip, an external flash or other external data storage, as referred to herein, is accessible to a SoC but not integrated on the SoC and is therefore external to the SoC. The external flash is unsecured. Besides the SoC, other components of, and entities with access to, the computing system can potentially access the sensitive information stored on the external flash.

To prevent unauthorized use of the sensitive information maintained on the external flash, the integrated secure element secures the sensitive information before writing the sensitive information to the external flash. The integrated secure element computes and stores a Message authentication Code (MAC) associated with the sensitive information and encrypts the sensitive information with a flash cryptographic key before writing the sensitive information to the external flash. Conversely, the integrated secure element, after reading the sensitive information from the external flash, decrypts the sensitive information and verifies the MAC stored when the sensitive information was encrypted. Without the flash cryptographic key, the sensitive information is secured and unusable.

The integrated secure element delivers what is referred to in cryptography as "perfect forward security" by changing the cryptographic key automatically. In case the flash cryptographic key is ever compromised, the flash cryptographic key is automatically updated before each encryption and subsequent write of data. By being part of the SoC, the integrated secure element like other components of the SoC, is without its own internal data storage. To provide a location to store the flash cryptographic key, the computing system includes a smaller, secure flash with a dedicated communication channel linking the integrated secure element to the secure flash.

The role of the secure flash is to supplement the integrated secure element to protect sensitive information stored on the external flash. In addition, to flash cryptographic key(s), the secure flash can store anti-replay counters, timestamp data, or other security information to prevent a replay or other type of attack. Because the secure flash stores the flash cryptographic key and other security information, and not the sensitive information stored on the external flash, the secure flash can be much smaller than the external flash; the secure flash may be a fraction of the size of the external flash. With future upgrades to the system, the size of the sensitive information can grow with increases in size to the external flash, however the integrated secure element and the secure flash do not also have to increase in size to scale accordingly. The secure flash maintains the flash cryptographic key and optionally, other security information, in a secure environment outside the SoC, and the integrated secure element accesses the flash cryptographic key from the SoC using the dedicated communication channel.

The integrated secure element and the secure flash secure the dedicated communication channel using a secure communication protocol, such as the Electronic Communication Diffie-Hellman key exchange protocol or "ECDH". ECDH enables two entities to jointly establish a shared secret key over an otherwise insecure channel. The shared secret key is used to sign communications using a symmetric key cipher. At production or in a pre-distribution, pre-sales, or manufacturing environment, the integrated secure element and the secure flash are assigned matching key information, e.g., the integrated secure element and the secure flash are each assigned the same certified public key and a unique private key pair. Communications over the dedicated communication channel are signed by each generating party. The non-generating party in each communication verifies the authenticity of the signature on a communication against an expected signature produced with the shared secret key.

The secure flash and the integrated secure element agree on the shared secret key dynamically, enabling secure communication over the dedicated communication channel without maintaining a master secret to generate or protect the flash cryptographic key(s). This way, even if the dedicated communication channel is compromised by an unauthorized listener or a replay attack, the data (e.g., the flash cryptographic key) exchanged over the dedicated channel is secured by implementing the prior-established secure-communication-protocol.

The secure flash and the integrated secure element are linked; the secure flash automatically generates a new flash cryptographic key on a regular basis, following a set-schedule, randomly, periodically, or in response to an event. For example, the secure flash generates a new flash cryptographic key once per day. The secure flash can generate a new flash cryptographic key in response to an impending write by the integrated secure element. In this way, the computing system protects sensitive information with what is commonly referred to in secure-computing as "perfect forward security". A secure flash, a non-secure flash, and an integrated secure element on a SoC, in combination, promote expansion and security of sensitive information maintained by a computing system, without compromising usability.

By way of example, an integrated secure element, of a SoC, that secures external data storage is described. The SoC stores data on a main external flash. A second external flash is assigned to the secure element. The second flash stores a flash cryptographic key. The secure element and the second flash are each provisioned with matching certified public keys and corresponding private keys. Given the public and private keys, and a predetermined cipher, the secure element and the second flash establish a secure channel based on a shared secret key. The secure element and the second flash communicate updates to the flash cryptographic key over the secure channel. The secure element executes specialized functions including automatically encrypting data it stores on the main external flash using the flash cryptographic key as the flash cryptographic key is regularly updated by the second flash.

FIG. 1 is a conceptual diagram illustrating an example system 100 with a secure element architecture including secure external data storage. The system 100 can be used in a variety of computing environments and computer applications. A mobile phone, a tablet device, a laptop computer, or any other device with a shared external flash and a system-on-chip for a processing complex can use the system 100 to maintain and secure sensitive information.

The system 100 includes a main flash 102, a SoC 108, and a secure flash 114. The main flash 102 stores sensitive information 104. The SoC 108 includes an integrated secure element 110. The secure flash 114 includes a flash cryptographic key 116. The main flash 102 and the SoC 108 communicate over a link 106. The link 106 may be a memory bus linking the SoC 108 and other components of the system 100 to the main flash 102. The integrated secure element 110 or other integrated components of the SoC 108 communicate with the main flash 102 over the link 106 to access data stored by the main flash 102. The integrated secure element 110 directs read or write commands issued by the SoC 108 over the link 106 to cause the main flash 102 to read or write the sensitive information 104.

The integrated secure element 110 and the secure flash 114 communicate using a direct channel 112. The direct channel 112, while dedicated to the integrated secure element 110, may or may not be secure. Other entities with access to the SoC 108 or other parts of the system 100 may have access to the direct channel 112.

The SoC 108 functions as a main processing complex of the system 100. In addition to the integrated secure element 110, the SoC 108 includes other components, such as processing units (e.g., central processing units, graphics processing units, artificial intelligence processing units, display processors, video processors), communication units (e.g., modems), input/output controllers, sensor hubs, and the like.

The main flash 102 can be any non-volatile memory component used for storing data, such as any type of electronically erasable programmable read-only memory (EEPROM). Although described primarily as flash memory, the main flash 102 can be non-flash storage. In a mobile phone context, the main flash 102 may be the "device flash". The main flash 102 is shared by the SoC 108 and other components of the system 100 (not shown). Unless the information is secured before being writing to the main flash 102, any entity with access to the system 100 may be able to read or modify the information on the main flash 102. As described in greater detail below, the main flash 102 is configured to store the sensitive information 104 that has been encrypted with the flash cryptographic key 116.

The integrated secure element 110 is any component of the SoC 108 that requires external storage for storing sensitive information, such as the sensitive information 104, for performing a function. The integrated secure element 110 may facilitate financial transactions and store a user's personal account information (e.g., account numbers, credentials, security tokens, routing numbers) required to complete the transactions. The integrated secure element 110 may perform a health monitoring function (e.g., monitoring a physiological condition) and require a portion of the main flash 102 to record a health record of the user. The integrated secure element 110 could be an embedded subscriber identity module (eSIM) on the SoC 108 and the integrated secure element 110 uses a portion of the main flash 102 to store telecommunication related data associated with the user. In an authentication or security context, the integrated secure element 110 may perform an authentication function (e.g., facial authentication, fingerprint authentication, other biometric security authentication) and require a portion of the main flash 102 to preserve authentication data (e.g., a user's biometric fingerprint) during an initialization for subsequent use and retrieval during future authentication requests.

The secure flash 114 is a secondary non-volatile memory component of the system 100. The secure flash 114 can include any flash type memory and/or non-flash type memory configured to securely store data. The secure flash 114 is typically smaller in storage capacity relative to the main flash 102. The secure flash 114 provides sufficient storage (e.g., a fraction of the capacity of the main flash 102) to hold the flash cryptographic key 116 and other information to protect the sensitive information 104 written to the main flash 102. Unlike data stored on the main flash 102, which is accessible to other entities of the system 100, the data maintained by the secure flash 114 is only accessible through the direct channel 112. The system 100 prevents unauthorizes access to the information stored on the secure flash 114 by securing the direct channel 112.

The integrated secure element 110 and the secure flash 114 are paired with matching certified keys (e.g., each provisioned with the CA root public key and a corresponding private key). Based on the keys, the integrated secure element 110 and the secure flash 114 establish a secure communication channel for exchanging data. A shared secret key is determined by the integrated secure element 110 and the secure flash 114. Based on the shared secret key, the integrated secure element 110 and the secure flash 114 sign, exchange, and verify communications. The shared secret key configures the direct channel 112 as a secure channel between the integrated secure element 110 and the secure flash 114 from which the integrated secure element 110 has exclusive access to the flash cryptographic key 116. The integrated secure element 110 encrypts or decrypts, using the flash cryptographic key 116, the sensitive information 104 stored at the main flash 102.

Figure 2:
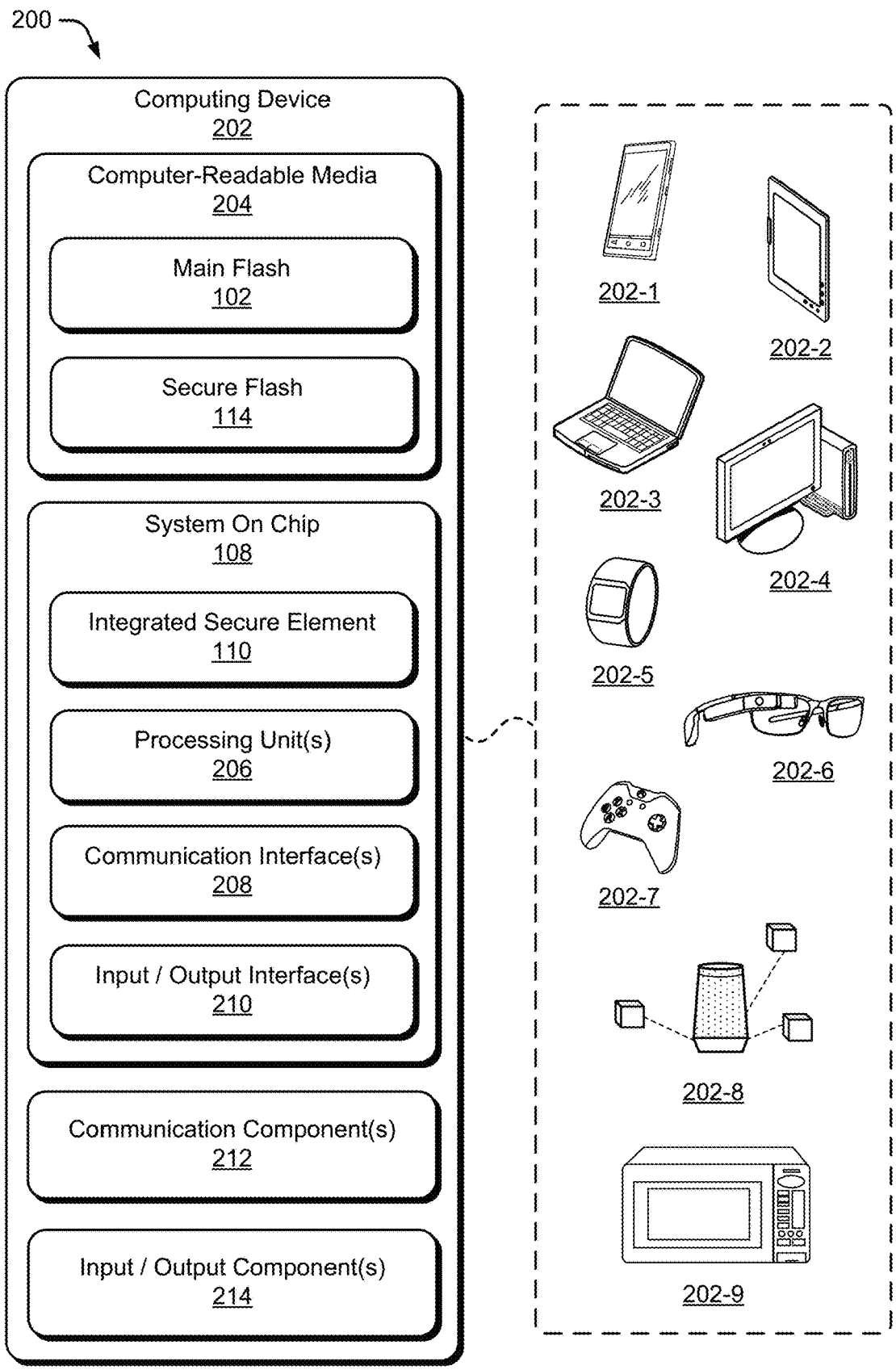
FIG. 2 is a conceptual diagram illustrating an example system as a computing device that secures external data storage for an integrated secure element.

FIG. 2 is a conceptual diagram illustrating an example system 200 as a computing device 202 with a secure element architecture including secure external data storage. The computing device 202 is an example computing environment or application for the system 100 of FIG. 1, with some additional detail. As some non-limiting examples, the computing device 202 can be a mobile phone 202-1 or automotive device, a tablet device 202-2, a laptop computer 202-3, a television/display or desktop computer 202-4, a computerized watch 202-5, or other wearable device 202-6, a game controller 202-7, a networked multimedia or voice assistant system 202-8, or an appliance 202-9.

The computing device 202 includes a computer-readable media 204 including the main flash 102 and the secure flash 114. The computing device 202 further includes the SoC 108 and the integrated secure element 110, which make up the rest of the system 100 from FIG. 1. The computing device 202 also includes one or more communication components 212 and one or more input/output components 214. The SoC 108 also includes one or more processing units 206, one or more communication interfaces 208, and one or more input/output interfaces 210.

The processing units 206 of the SoC 108 processes computer-executable instructions to perform operations and execute functions of the computing device 202. The processing units 206 may include any combination of one or more controllers, microcontrollers, processors, microprocessors, hardware processors, hardware processing units, digital-signal-processors, graphics processors, graphics processing units, video processors, video processing units, and the like.

The computer-readable media 204 store information and process the instructions that are executed by the processing units 206 to perform operations and execute functions. The computer-readable media 204 is configured to provide the computing device 202 with persistent and/or non-persistent storage of executable instructions (e.g., firmware, recovery firmware, software, applications, modules, programs, functions, and the like) and data (e.g., user data, operational data, scan results) to support execution of the executable instructions. Examples of the computer-readable media 204 include volatile memory and non-volatile memory, fixed and removable media devices, and any suitable memory device or electronic data storage that maintains executable instructions and supporting data. The computer-readable media 204 can include various implementations of random-access memory (RAM), read-only memory (ROM), flash memory, and other types of storage memory in various memory device configurations. The computer-readable media 204 excludes propagating signals. The computer-readable media 204 may be a solid-state drive (SSD) or a hard disk drive (HDD). The computer-readable media 204 in the example of FIG. 2 includes the main flash 102 and the secure flash 114 as flash memory examples of the computer-readable media 204.

The communication components 212 enable wired and/or wireless communication of device data between the computing device 202 and other devices, computing systems, and networks. The communication components 212 can include receivers, transmitters, and transceivers for various types of wired and wireless communications. A cellular radio for connecting to a base station of a cellular network and a short-range radio configured to connect to an access point of a wireless local area network (WLAN) are examples of the communication components 212. The SoC 108 includes the communication interfaces 208 to handle messaging and protocols associated with communications being transmitted and received using the communication components 212.

The input/output components 214 provide connectivity to the computing device 202. The input/output components 214 can include a user interface device that manages a user interface of the computing device 202, such as a user interface to an operating system. The input/output components 214 may provide additional connectivity, beyond just the user interface device. The input/output components 214 can operate as a presence-sensitive display or touchscreen including a display and a presence-sensitive-input or touch-input component operatively coupled to (and in some cases physically integrated with) the display. The input/output components 214 can include sensors for obtaining contextual information indicative of a physical operating environment of the computing device 202 and/or characteristics of the computing device 202. Sensor examples of the input/output components 214 include camera sensors, optical sensors, infrared sensors, radar sensors, movement sensors, temperature sensors, position sensors, proximity sensors, other light sensors, moisture sensors, pressure sensors, and the like. The input/output components 214 may provide additional connectivity, beyond just the user interface device 216 and the sensors. Input/output devices 214 can also include data interfaces or data input ports for receiving data, including user inputs, communication data, audio data, video data, image data, and the like. The processing units 206 may tailor operations according to input information obtained by the input/output interfaces 210 from the input/output components 214. Likewise, based on information obtained by the communication interfaces 208 from the communication components 212, the processing units 206 tailor operations according to incoming or outgoing communications.

As a working example, consider the computing device 202 as a computerized watch 202-5 worn by a user purchasing a product at a store. The communication components 212 detect short-range communication signals from a cash register as the user stands in line to pay the store's cashier. The communication interfaces 208 and the communication components 212 are linked. The processing units 206 receive information from the communication interfaces 208 based on the communication signals received by the communication components 212. The integrated secure element 110 acts on the information received by the processing units 206, e.g., to complete a payment function with the cash register. The integrated secure element 110 uses a flash cryptographic key stored at the secure flash 114 to decrypt banking information being stored on the main flash 102, as encrypted data. The integrated secure element 110 receives the flash cryptographic key from the secure flash 114 over a dedicated channel. The dedicated channel is secured according to a secure communication protocol based on a secret key established during negotiations between the integrated secure element 110 and the secure flash 114. The integrated secure element 110 automatically process the payment using the decrypted banking information obtained from the main flash 102. The integrated secure element 110 can communicate with the input/output interfaces 210 to support a user interface provided by the input/output components 214. The integrated secure element 110 sends a signal through the processing units 206 to the input/output components 214, the signal indicating when payment is complete. In response to the signal indicating when the payment is complete, the input/output components 214 alter the user interface to indicate a successful payment to the user.

Figure 3:
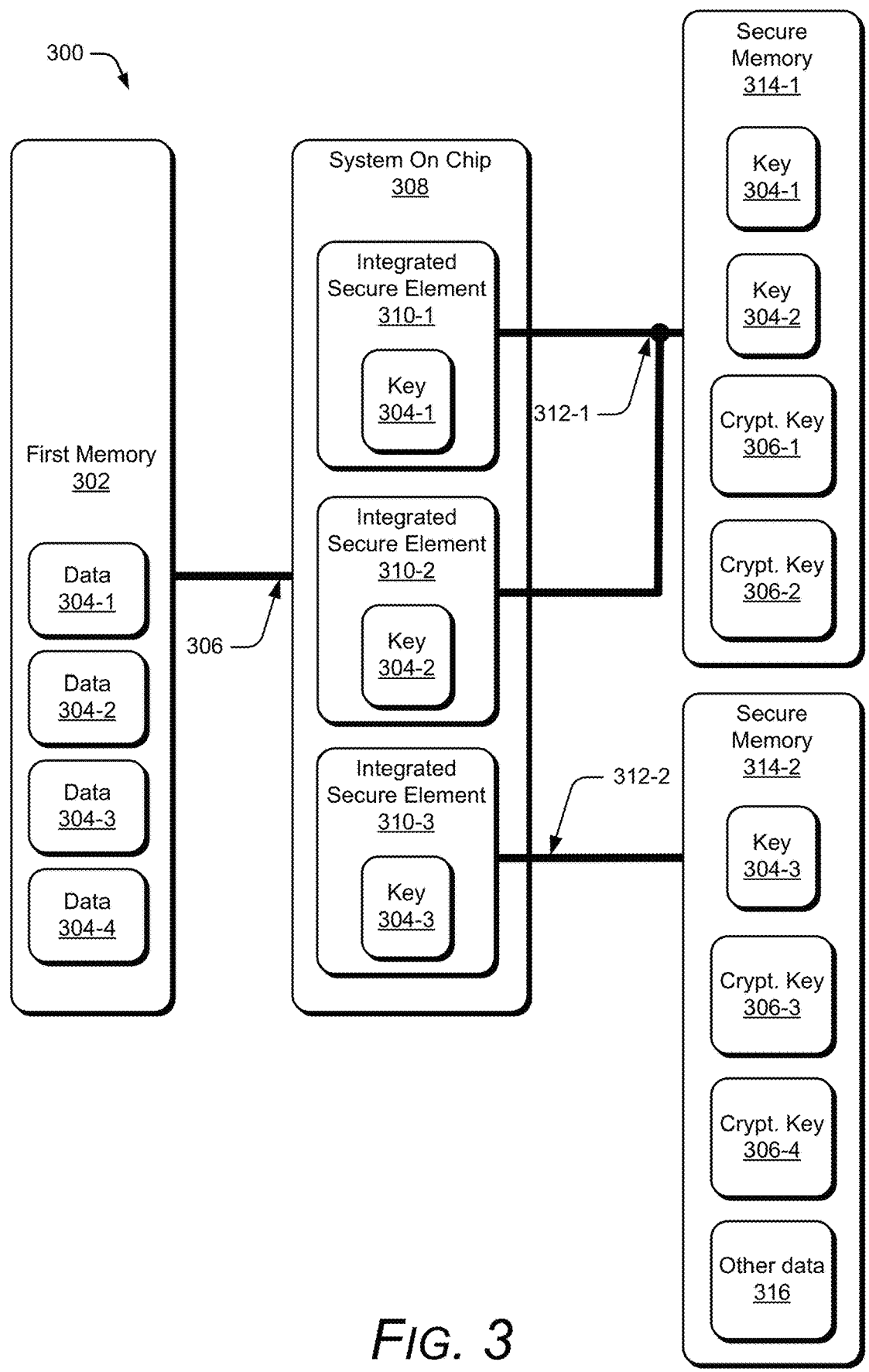
FIG. 3 is a conceptual diagram illustrating an example system that secures external data storage for an integrated secure element.

FIG. 3 is a conceptual diagram illustrating an example system 300 with a secure element architecture including secure external data storage. The system 300 includes similar components to that shown in the systems 100 and 200 illustrated in FIGS. 1 and 2.

The system 300 includes a first external memory 302 (referred to simply as "first memory 302") and two secure external memories, a secure memory 314-1 and a secure memory 314-2. The first memory 302 may be a device memory or a device flash similar to the main flash 102. Each of the two-second memories 314-1 and 314-2 is a secure memory and may each be a secure flash like the secure flash 114. One or both of the second memories 314-1 and 314-2 may be a different type of secure memory.

The system 300 includes a SoC 308 similar to the SoC 108. The SoC 308 includes multiple integrated secure elements 310-1, 310-2, and 310-3. Each of the integrated secure elements 310-1, 310-2, and 310-3 is an example of the integrated secure element 110.

The first memory 302 and the system on chip 308 are communicatively coupled via a memory bus 306. Other components of the system 300 can access the first memory 302 using the memory bus 306.

Dedicated channels 312-1 and 312-2 communicatively couple the multiple integrated secure elements 310-1, 310-2, and 310-3 to the secure memories 314-1 and 314-2. The dedicated channel 312-1 communicatively couples the integrated secure elements 310-1 and 310-2 to the secure memory 314-1. The dedicated channel 312-2 communicatively couples the integrated secure element 310-3 to the secure memory 314-2.

The first memory 302 stores data 304-1, data 304-2, data 304-3, and data 304-4. The integrated secure element 310-1 secures the data 304-1 by encrypting the data 304-1 before the first memory 302 writes the data 304-1. Likewise, the integrated secure element 310-2 encrypts the data 304-2 before the data 304-2 is written to the first memory 302. The integrated secure element 310-3 manages both the data 304-3 and the data 304-4. The integrated secure element 310-3 encrypts the data 304-3 or the data 304-4 before the first memory 302 writes the data 304-3 or the data 304-4.

The secure memory 314-1 stores a cryptographic key 306-1 which the integrated secure element 310-1 uses to encrypt or decrypt the data 304-1 at the first memory 302. The secure memory 314-1 also stores a cryptographic key 306-2 which the integrated secure element 310-2 uses to encrypt or decrypt the data 304-2. The secure memory 314-2 stores a cryptographic key 306-3 which the integrated secure element 310-3 uses to encrypt or decrypt the data 304-3. The secure memory 314-2 also stores a cryptographic key 306-4. The integrated secure element 310-3 may use the cryptographic key 306-4 to encrypt or decrypt the data 304-4. In other examples, the integrated secure element 310-3 encrypts or decrypts the data 304-4 using the same cryptographic key 306-3 used to encrypt or decrypt the data 304-3. The secure memory 314-2 also stores other data 316. Examples of other data include timestamp information (for determining an age of a cryptographic key), replay counters to thwart a replay attack, or other information necessary to secure the dedicated channel 312-2 to enable access, by the integrated secure element 310-3, to the information stored on the secure memory 314-2.

To secure the cryptographic keys 306-1, 306-2, and 306-3, the secure memories 314-1 and 314-2 and the integrated secure elements 310-1, 310-2, and 310-3 secure the dedicated channels 312-1 and 312-2. By establishing shared secret keys to sign the communications on the dedicated channels 312-1 and 312-2, the secure memories 314-1 and 314-2 and the integrated secure elements 310-1, 310-2, and 310-3 can verify that the communications are authentic, and not part of a replay attack, or other malicious attempts to access the SoC 308 or the data 304-1, 304-2, or 304-3.

The secure memories 314-1 and 314-2, together with the integrated secure elements 310-1, 310-2, and 310-3 perform ECDH or other secure communication techniques using respective copies of a CA public root key and a corresponding private key to agree on shared keys 304-1, 304-2, and 304-3, that the entities can then use to secure their communications on the dedicated channels 312-1 and 312-2. The secure memory 314-1, the secure memory 314-2, and each of the integrated secure elements 310-1 through 310-3 are loaded with a respective copy of a CA public root key and a corresponding private key.

The secure memory 314-1 and the integrated secure element 310-1 use their public and private keys to agree on a shared key 304-1 that the entities then use to secure their communications on the dedicated channel 312-1. The secure memory 314-1 and the integrated secure element 310-2 use their public and private keys to agree on a different shared key 304-2 that the entities then use to secure their communications on the dedicated channel 312-1. Even though both the integrated secure elements 310-1 and 310-2 communicate with the secure memory 314-1 over the same dedicated channel 312-1, each uses a different secure channel based on a different shared key 304-1 or 304-2 so the integrated secure elements 310-1 and 310-2 only have access to their own, and do not have access to each other's, cryptographic key 306-1 and 306-2.

Finally, the secure memory 314-2 and the integrated secure element 310-3 use the public and private keys to agree on a unique shared key 304-3 that the entities then use to secure their communications on the dedicated channel 312-2. When the dedicated channel 312-2 is secured, the integrated secure element 310-3 has exclusive access to both cryptographic keys 306-3 and 306-4, using a single secure channel.

As such, the system 300 is an example of a secure element architecture with secure external storage including multiple secure channels between multiple integrated secure elements and multiple secure memories. With the secure element architecture of the system 300, the integrated secure element 310-1 has exclusive access to the cryptographic key 306-1, the integrated secure element 310-2 has exclusive access to the cryptographic key 306-2, and the integrated secure element 310-3 has exclusive access to the cryptographic keys 306-3 and 306-4. With secure and exclusive access to a respective subset of the cryptographic keys 306-1, 306-2, 306-3, and 306-4, the integrated secure elements 310-1, 310-2, and 310-3 can independently manage security of their respective data 304-1, 304-2, 304-3, and 304-4, while promoting expansion and security of the respective data 304-1, 304-2, 304-3, and 304-4, without compromising usability.

Figure 4:
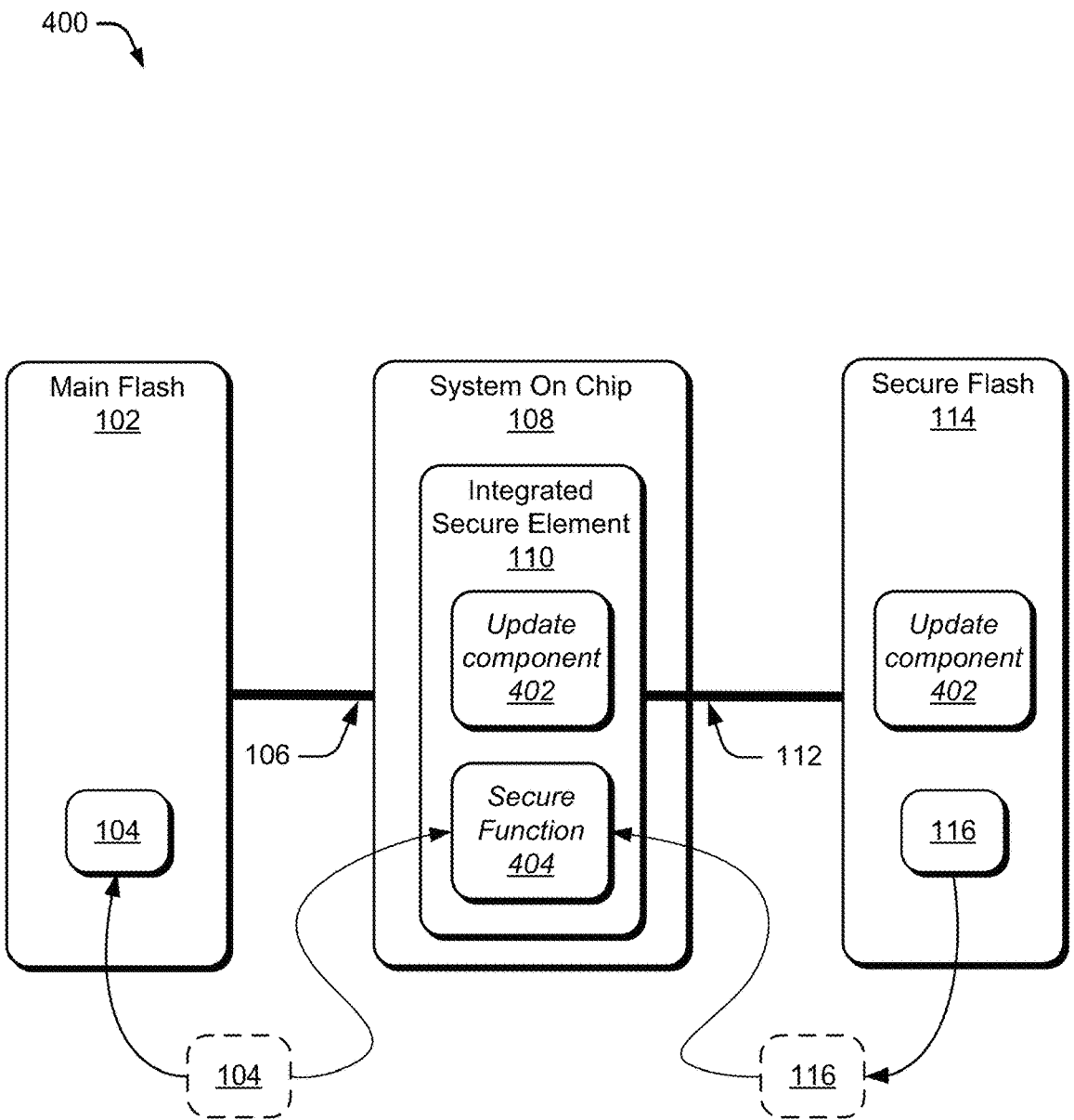
FIG. 4 is a conceptual diagram illustrating an example system that secures external data storage for multiple integrated secure elements.

FIG. 4 is a conceptual diagram illustrating an example system 400 with a multiple, secure element architecture including secure external data storage. The system 400 includes the main flash 102, the SoC 108, and the secure flash 114 from the system 100. The SoC 108 includes the integrated secure element 110 which, in this example, includes a secure function component 404. The secure flash 114 includes an update component 402 in addition to the flash cryptographic key 116. In some examples, the integrated secure element 110 also includes the update component 402 so that either the integrated secure element 110 or the secure flash 114 can update a cryptographic key. The secure function component 404 and the update component 402 may be implemented as hardware, programmable logic, and/or embedded software.

The secure function component 404 is configured to perform an operation on the sensitive information 104 stored at the main flash 102. The secure function component 404 decrypts the sensitive information 104 using the flash cryptographic key 116 and likewise, encrypts the sensitive information 104 using the flash cryptographic key 116 when writing the sensitive information 104 to the main flash 102. The secure function can compute a MAC prior to encrypting the sensitive information 104 and store the MAC to verify the sensitive information 104, during a subsequent read and decryption of the sensitive information 104.

The update component 402, whether part of the integrated secure element 110 or the secure flash 114, is configured to update the flash cryptographic key 116 automatically, e.g., in an effort to promote "perfect forward security". The update component 402 can generate a new flash cryptographic key 116 on a schedule, periodically, randomly, or in response to an event. The secure function 404 can cause the integrated secure element to communicate over the dedicated channel 112 a request for the flash cryptographic key 116 or provide the flash cryptographic key 116 when generated by the integrated secure element 110.

Figure 5:
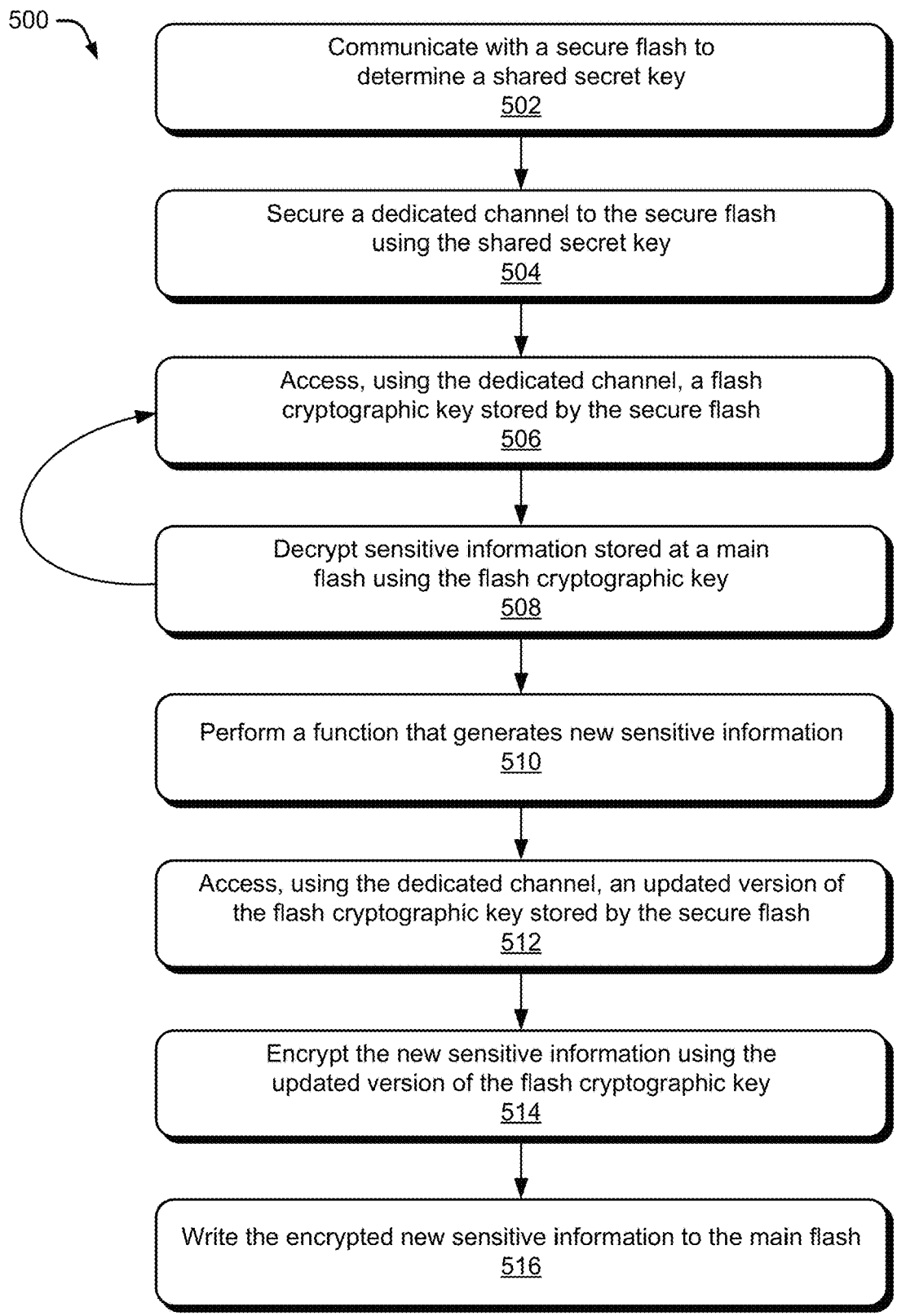
FIG. 5 is a flow-chart illustrating example operations performed by an example system that secures external data storage for an integrated secure element.

For example, the secure function component 404 indicates in the request that the request supports impending encryption and write operations of the sensitive information 104. Based on the indication that the request supports an impending write, the update component 402 can generate a new flash cryptographic key that replaces the old flash cryptographic key 116 and can send the new flash cryptographic key to the secure function component 404, in response to the request. If the secure function component 404 indicates in the request that the request is not for impending encryption and write operations of the sensitive information 104, the secure flash 114 responds to the request with the flash cryptographic key 116 without the update component 402 generating a new flash cryptographic key. If the update component 402 of the integrated secure element 110 generates a new flash cryptographic key that replaces the old flash cryptographic key 116, the secure function 104 can send the new flash cryptographic key to the secure function component 404, instead of a request. FIG. 5 is a flow-chart illustrating example operations 500 performed by an example system with a secure element architecture including secure external data storage. The operations 500 are described in the context of the system 100 of FIG. 1. The operations 500 may be performed in a different order or with additional or fewer operations than what is shown.

At 502, the integrated secure element 110 communicates with the secure flash 114 to determine a shared secret key (e.g., key 304-1, key 304-2, key 304-3). The integrated secure element 110 and the secure flash 114 exchange information over the dedicated channel 112. Using ECDH or other key exchange protocol, the integrated secure element 110 and the secure flash 114 negotiate a shared secret key which enables secure communication over the dedicated channel 112.

At 504, the integrated secure element 110 secures a dedicated channel 112 to the secure flash 114 using the shared secret key. Using the shared key, the integrated secure element 110 and the secure flash 114 sign communications to indicate authenticity.

At 506, the integrated secure element 110 accesses, using the dedicated channel 112, a flash cryptographic key 116 stored by the secure flash 114. The integrated secure element 110 requests the flash cryptographic key 116 from the secure flash 114 and the secure flash 114 returns the flash cryptographic key 116 in communication over the dedicated channel 112, which is secured based on the shared key.

At 508, the integrated secure element 110 decrypts, using the flash cryptographic key 116, sensitive information 104 stored at the main flash 102 using the flash cryptographic key 116. The sensitive information 104 can include data such as cryptographic keys, network access credentials, security keys, financial data, or user data. The integrated secure element 110 performs a function (e.g., a cryptographic function, a network authentication function, a security function, a financial transaction function) using the sensitive information 104 and repeats the operations 506 and 508 as necessary to perform functions using the sensitive information 104.

In some instances, the integrated secure element 110 modifies the sensitive information 104 or generates new sensitive information. At 510, the integrated secure element performs a function that generates new sensitive information.

At 512, the integrated secure element 110 accesses, using the dedicated channel 112, an updated version of the flash cryptographic key 116 stored by the secure flash 114. Prior to writing the new sensitive information to the main flash 102, the integrated secure element 110 communicates with the secure flash 114 to obtain a new flash cryptographic key to replace the flash cryptographic key 116. The secure flash 114 automatically updates the flash cryptographic key 116 prior to the integrated secure element 110 using the flash cryptographic key 116 to encrypt data. Alternatively, the integrated secure element 110 updates the flash cryptographic key 116 and provides the updated flash cryptographic key to the secure flash 114.

At 514, the integrated secure element 110 encrypts the new sensitive information 104 using the updated version of the flash cryptographic key 116 prior to writing the new sensitive information to the main flash 102. The integrated secure element computes a MAC associated with the updated flash cryptographic key 116 and verifies the MAC to validate the updated flash cryptographic key 116. At 516, the integrated secure element 110 writes the encrypted new sensitive information to the main flash 102.

Example 1. A computing system comprising: a first flash configured to store sensitive information that has been encrypted with a flash cryptographic key; a second flash configured to store the flash cryptographic key; a system-on-chip including an integrated secure element that cryptographically protects, using the flash cryptographic key, the sensitive information stored at the first flash; and a secure channel between the integrated secure element and the second flash from which the integrated secure element has exclusive access to the flash cryptographic key.

Example 2. The computing system of example 1, wherein: the integrated secure element and the second flash each include a corresponding public and private key; the integrated secure element and the second flash are configured to determine, based on the public key, a shared secret key that enables communication over the secure channel using the Electronic Communication Diffie-Hellman key exchange protocol.

Example 3. The computing system of example 2, wherein the second flash further includes an anti-replay counter or time-stamp information for the flash cryptographic key.

Example 4. The computing system of any of examples 2 or 3, wherein the sensitive information is first sensitive information and one or both of the integrated secure element and the second flash is configured to automatically update the flash cryptographic key prior to the integrated secure element using the flash cryptographic key to encrypt second sensitive information at the first flash.

Example 5. The computing system of any of examples 2-4, wherein the second flash is configured to automatically update the flash cryptographic key periodically.

Example 6. The computing system of any of examples 1-5, wherein the first flash is a shared flash, the computing system further comprising one or more other components that access the shared flash and are without access to the shared secret key or the secure channel.

Example 7. The computing system of any of examples 1-6, wherein: the flash cryptographic key is a first flash cryptographic key; the sensitive information is first sensitive information; the integrated secure element is a first integrated secure element; the secure channel is a first secure channel; the first flash is further configured to store second sensitive information that has been encrypted with a second flash cryptographic key; the second flash is further configured to store the second flash cryptographic key; the system-on-chip includes a second integrated secure element that encrypts or decrypts, using the second flash cryptographic key, the second sensitive information stored at the first flash; and the computing system further comprises a second secure channel between the second integrated secure element and the second flash from which the second integrated secure element has exclusive access to the second flash cryptographic key.

Example 8. The computing system of any of examples 1-7, wherein: the flash cryptographic key is a first flash cryptographic key; the sensitive information is first sensitive information; the second flash is further configured to store a second flash cryptographic key; the first flash is further configured to store second sensitive information that has been encrypted with the second flash cryptographic key; the integrated secure element is further configured to encrypt or decrypt, using the second flash cryptographic key, the second sensitive information stored at the first flash; and the secure channel between the integrated secure element and the second flash provides the integrated secure element with exclusive access to the first flash cryptographic key and the second flash cryptographic key.

Example 9. The computing system of any of examples 1-8, wherein a storage capacity of the first flash is greater than a storage capacity of the second flash.

Example 10. The computing system of any of examples 1-9, wherein the sensitive information comprises at least one of cryptographic keys, network access credentials, security keys, financial data, or user data.

Example 11. A method for securing sensitive information at an external flash of a computing system, the method comprising: communicating, by an integrated secure element of a system-on-chip and over a dedicated channel between the integrated secure element and a second flash of the computing system, information for determining a shared secret key based on a respective copy of public and private keys preprogrammed into each of the integrated secure element and the second flash; securing, based on the shared secret key, the dedicated channel to provide the integrated secure element with exclusive access to a flash cryptographic key stored by the second flash; responsive to securing the dedicated channel, accessing, via the dedicated channel, the flash cryptographic key stored by the second flash; and cryptographically protecting, using the flash cryptographic key, sensitive information stored at the external flash.

Example 12. The method of example 11, wherein the sensitive information is first sensitive information and the flash cryptographic key is a first flash cryptographic key, the method further comprising: prior to writing second sensitive information to the external flash, obtaining, via the dedicated channel, a second flash cryptographic key automatically generated by the second flash to replace the first flash cryptographic key; and encrypting, using the second flash cryptographic key, the second sensitive information prior to writing the second sensitive information to the external flash.

Example 13. The method of any of the preceding examples 11-12, wherein encrypting or decrypting the sensitive information stored at the external flash comprises: encrypting the sensitive information using the flash cryptographic key; and after encrypting the sensitive information, writing the sensitive information to the first hash.

Example 14. The method of any of the preceding examples 11-13, wherein encrypting or decrypting the sensitive information stored at the external flash comprises: reading the sensitive information from the external flash; and after reading the sensitive information from the external flash, decrypting the sensitive information using the flash cryptographic key.

Example 15. The method of any of the preceding examples 11-14, wherein communicating the information for determining the shared secret key is in furtherance of the Electronic Communication Diffie-Hellman key exchange protocol.

Example 16. The method of any of the preceding examples 11-15, wherein accessing the flash cryptographic key comprises obtaining other information stored by the second flash with the flash cryptographic key, the other information comprising an anti-replay counter or time-stamp information for validating the flash cryptographic key.

Example 17. The method of any of the preceding examples 11-16, wherein the flash cryptographic key comprises a first flash cryptographic key and accessing the first flash cryptographic key comprises automatically receiving an updated flash cryptographic key from the second flash that replaces the first flash cryptographic key.

Example 18. The method of any of the preceding examples 11-17, wherein the flash cryptographic key is a first flash cryptographic key, the method further comprising: after encrypting the sensitive information using the first flash cryptographic key, writing the sensitive information to the external flash; determining a modification to the sensitive information; obtaining, via the dedicated channel, a second flash cryptographic key automatically generated by the second flash to replace the first flash cryptographic key; encrypting, using the second flash cryptographic key, the sensitive information after modifying the sensitive information; and replacing, on the external flash, the sensitive information encrypted using the first flash cryptographic key with the modified sensitive information encrypted using the second flash cryptographic key.

Example 19. The method of any of the preceding examples 11-18, wherein securing the dedicated channel comprises communicating with the second flash in secret to prevent another secure element of the system-on-chip that is communicating with the second flash from accessing the flash cryptographic key.

Example 20. The method of any of the preceding examples 11-19, wherein the external flash is a shared flash accessible to other components of the computing system.

Example 21. The method of any of the preceding examples 11-20, wherein the dedicated channel between the integrated secure element and the second flash comprises an exclusive, physical link between the integrated secure element and the second flash.

Example 22. The method of any of the preceding examples 11-21, wherein the sensitive information comprises at least one of: cryptographic keys, network access credentials, security keys, financial data, or user data.

Example 23. A mobile computing device comprising an integrated secure element of a system-on-chip configured to perform any of the methods of the preceding examples 11-22.

Example 24. A system comprising means to perform any of the methods of the preceding examples 11-22.

Example 25. A computer-readable storage medium comprising instructions that, when executed, configure an integrated secure element of a system-on-chip to perform any of the methods of the preceding examples 11-22.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for securing sensitive information in a flash memory of a computing system, the method comprising:

communicating, by an integrated secure element (ISE) of a system-on-chip of the computing system and over a dedicated channel between the ISE and a secure flash memory external to the system-on-chip, information for determining a shared secret key useful to enable secure communication between the ISE of the system-on-chip and the secure flash memory over the dedicated channel, the information based on a first public key and private key pair preprogrammed into the ISE and a second public key and private key pair preprogrammed into the secure flash memory;

securing, based on the shared secret key, the dedicated channel between the ISE of the system-on-chip and the secure flash memory external to the system-on-chip to establish a secure dedicated channel to provide the ISE with exclusive access to a flash cryptographic key stored by the secure flash memory external to the system-on-chip;

accessing, via the secure dedicated channel, the flash cryptographic key stored by the secure flash memory external to the system-on-chip; and cryptographically protecting, using the flash cryptographic key obtained from the secure flash memory, sensitive information written to the flash memory of the computing system via an interface between the system-on-chip and the flash memory that is separate from the dedicated channel between the ISE and the secure flash memory, the flash memory external to the system-on-chip.

2. The method of claim 1, wherein the sensitive information is first sensitive information written to the flash memory and the flash cryptographic key is a first flash cryptographic key, the method further comprising:

prior to writing second sensitive information to the flash memory of the computing system, obtaining a second flash cryptographic key; and cryptographically protecting, using the second flash cryptographic key, the second sensitive information prior to writing the second sensitive information to the flash memory of the computing system.

3. The method of claim 2, wherein obtaining the second flash cryptographic key further comprises:

generating the second flash cryptographic key prior to sharing the second flash cryptographic key with the secure flash memory; or receiving the second flash cryptographic key after the secure flash memory generates the second flash cryptographic key.

4. The method of claim 1, wherein cryptographically protecting the sensitive information written to the flash memory further comprises:

encrypting the sensitive information using the flash cryptographic key; and after encrypting the sensitive information, writing the sensitive information to the flash memory of the computing system.

5. The method of claim 1, wherein cryptographically protecting the sensitive information written to the flash memory further comprises:

reading the sensitive information from the flash memory of the computing system; and after reading the sensitive information from the flash memory, decrypting and authenticating the sensitive information using the flash cryptographic key.

6. The method of claim 1, wherein communicating the information for determining the shared secret key is implemented as part of an Electronic Communication Diffie-Hellman key exchange protocol.

7. The method of claim 1, wherein accessing the flash cryptographic key further comprises obtaining other security information stored by the secure flash memory with the flash cryptographic key, the other security information comprising an anti-replay counter or time-stamp information for validating the flash cryptographic key.

8. The method of claim 1, wherein the flash cryptographic key is a first flash cryptographic key, the method further comprising:

after encrypting the sensitive information using the first flash cryptographic key, writing the sensitive information to the flash memory;

determining a modification to the sensitive information to provide modified sensitive information;

obtaining, via the dedicated channel, a second flash cryptographic key automatically generated by the secure flash memory;

validating the second flash cryptographic key by computing a message authentication code;

responsive to validating the second flash cryptographic key, encrypting, using the second flash cryptographic key, the modified sensitive information; and replacing, on the flash memory, the sensitive information encrypted using the first flash cryptographic key with the modified sensitive information encrypted using the second flash cryptographic key.

9. The method of claim 1, wherein securing the dedicated channel further comprises communicating with the secure flash memory in secret to prevent another secure element of the system-on-chip that is communicating with the secure flash memory from accessing the flash cryptographic key.

10. The method of claim 1, wherein the flash memory is not integrated into the system-on-chip and is a shared flash memory accessible to the system-on-chip and to other components of the computing system.

11. The method of claim 1, wherein the dedicated channel between the ISE and the secure flash memory comprises an exclusive, physical link between the ISE and the secure flash memory.

12. The method of claim 1, wherein the sensitive information comprises at least one of: cryptographic keys, network access credentials, security keys, financial data, or user data.

13. A computing system comprising:
a flash memory;
a secure flash memory; and
a system-on-chip comprising an integrated secure element (ISE) and computer-readable storage media having stored thereon instructions that, responsive to execution by a processor of the system-on-chip, direct the ISE to:

communicate, over a dedicated channel between the ISE and the secure flash memory that is external to the system-on-chip, information to determine a shared secret key useful to secure communication between the ISE and the secure flash memory over the dedicated channel, the information based on a first public key and private key pair preprogrammed into the ISE and a second public key and private key pair preprogrammed into the secure flash memory;

secure, based on the shared secret key, the dedicated channel between the ISE of the system-on-chip and the secure flash memory external to the system-on-chip to establish a secure dedicated channel to provide the ISE with exclusive access to a flash cryptographic key stored by the secure flash memory external to the system-on-chip;

access, via the secure dedicated channel, the flash cryptographic key stored by the secure flash memory external to the system-on-chip; and use the flash cryptographic key obtained from the secure flash memory to cryptographically protect sensitive information written by the system-on-chip to the flash memory of the computing system via an interface between the system-on-chip and the flash memory that is separate from the dedicated channel between the ISE and the secure flash memory, the flash memory external to the system-on-chip.

14. The computing system of claim 13, wherein:

the sensitive information is first sensitive information and the flash cryptographic key is a first flash cryptographic key, and the execution of the instructions further directs the ISE to, before second sensitive information is written to the flash memory, obtain a second flash cryptographic key from the secure flash memory, and use the second flash cryptographic key to cryptographically protect the second sensitive information.

15. The computing system of claim 14, wherein to obtain the second flash cryptographic key from the secure flash memory, the execution of the instructions further directs the ISE to:

generate the second flash cryptographic key; or receive the second flash cryptographic key after the secure flash memory generates the second flash cryptographic key.

16. The computing system of claim 13, wherein to use the flash cryptographic key obtained from the secure flash memory to cryptographically protect the sensitive information written to the flash memory, the execution of the instructions further directs the ISE to:

use the flash cryptographic key to encrypt the sensitive information; and after the sensitive information is encrypted, write the sensitive information to the flash memory of the computing system.

17. The computing system of claim 13, wherein to use the flash cryptographic key obtained from the secure flash memory to cryptographically protect the sensitive information written to the flash memory, the execution of the instructions further directs the ISE to:

read the sensitive information from the flash memory; and use the flash cryptographic key to decrypt and authenticate the sensitive information after the sensitive information is read from the flash memory.

18. The computing system of claim 13, wherein the communication of the information to determine the shared secret key is implemented as part of an Electronic Communication Diffie-Hellman key exchange protocol.

19. The computing system of claim 13, wherein to access the flash cryptographic key stored by the secure flash memory, the execution of the instructions further directs the ISE to:

obtain other security information stored by the secure flash memory with the flash cryptographic key, wherein the other security information comprises at least one of:

an anti-replay counter; or time-stamp information for validation of the flash cryptographic key.

20. The computing system of claim 13, wherein the flash cryptographic key is a first flash cryptographic key, and the execution of the instructions further directs the ISE to:

use the first flash cryptographic key to write the sensitive information to the flash memory after encryption of the sensitive information;

determine a modification to the sensitive information to provide modified sensitive information;

obtain, via the dedicated channel, a second flash cryptographic key automatically generated by the secure flash memory;

compute a message authentication code to validate the second flash cryptographic key;

responsive to the validation of the second flash cryptographic key, use the second flash cryptographic key to encrypt the modified sensitive information; and replace, on the flash memory, the sensitive information encrypted with the first flash cryptographic key with the modified sensitive information encrypted with the second flash cryptographic key.

\* \* \* \* \*